(12) United States Patent
Risinger

(10) Patent No.: US 7,690,130 B1
(45) Date of Patent: Apr. 6, 2010

(54) PUNCH DEFLECTION GAUGE

(75) Inventor: David Risinger, Louisville, KY (US)

(73) Assignee: Elizabeth Carbide Kentucky, Inc. KY (US)

( * ) Notice: Subject to any disclaimer, the term of this patent is extended or adjusted under 35 U.S.C. 154(b) by 113 days.

(21) Appl. No.: 12/130,300

(22) Filed: May 30, 2008

(51) Int. Cl.
*G01B 3/22* (2006.01)
(52) U.S. Cl. .............................. 33/833; 33/832; 33/549
(58) Field of Classification Search ........... 33/832–833, 33/836, 531–532, 542, 549, 555, 555.1
See application file for complete search history.

(56) References Cited

U.S. PATENT DOCUMENTS

| | | | |
|---|---|---|---|
| 3,986,010 A | 10/1976 | Lankford et al. | |
| 4,334,178 A | 6/1982 | Lipp | |
| 4,489,578 A | 12/1984 | Nagai et al. | |
| 4,583,159 A | 4/1986 | Kanemoto et al. | |
| 4,813,152 A * | 3/1989 | Spencer | 33/638 |
| 4,817,006 A | 3/1989 | Lewis | |
| 4,866,643 A | 9/1989 | Dutler | |
| 4,899,094 A | 2/1990 | Pilborough | |
| 5,077,909 A * | 1/1992 | Cranor | 33/607 |
| 5,136,521 A | 8/1992 | van Daalen et al. | |
| 5,357,450 A | 10/1994 | Hemmerle et al. | |
| 5,361,470 A | 11/1994 | Hamada et al. | |
| 5,438,521 A | 8/1995 | Lindstrom | |
| 5,661,656 A | 8/1997 | Goldman | |
| 6,044,573 A * | 4/2000 | Cockrill | 33/836 |
| 6,446,348 B1 * | 9/2002 | Brian | 33/532 |
| 6,698,105 B2 * | 3/2004 | Shen et al. | 33/836 |
| 6,792,691 B2 * | 9/2004 | Genal et al. | 33/833 |
| 6,810,599 B2 * | 11/2004 | Obrachta et al. | 33/532 |
| 6,830,442 B2 | 12/2004 | Cecil | |
| 7,065,897 B2 * | 6/2006 | Luner et al. | 33/836 |
| 7,581,330 B1 * | 9/2009 | Redmond | 33/611 |
| 2002/0152628 A1 * | 10/2002 | Buckner et al. | 33/833 |
| 2009/0031573 A1 * | 2/2009 | Zhang et al. | 33/555.1 |
| 2009/0094851 A1 * | 4/2009 | Xiao et al. | 33/832 |

* cited by examiner

*Primary Examiner*—Yaritza Guadalupe-McCall
(74) *Attorney, Agent, or Firm*—Robert H. Eichenberger; Scott W. Higdon; Middleton Ruetlinger

(57) ABSTRACT

A punch deflection gauge is provided having a die adaptor, indicator base, and dial indicator. An indicator stem of the dial indicator measures deflection of a punch in a punch orifice. In some embodiments a plurality of variably sized die adaptors are provided and are removably attachable to the same indicator base.

32 Claims, 5 Drawing Sheets

PUNCH DEFLECTION GAUGE

CROSS-REFERENCE TO RELATED APPLICATIONS

Not applicable.

BACKGROUND OF THE INVENTION

1. Field of the Invention

The present invention is related generally to a gauge that measures deflection and more specifically to a gauge that measures deflection of a punch in a punch press.

2. Description of Related Art

Dial indicators have been used to measure the amount of deflection of a punch in a tablet punch press. However, such indicators have been problematic and difficult to position in a manner such that the dial indicator stem is located proximal to the point where the punch enters the die.

SUMMARY OF THE INVENTION

In some embodiments of the present invention a punch deflection gauge has a die adaptor sized and shaped to be removably secured in a die socket. An indicator base is attached to the die adaptor and has a punch orifice and a dial indicator orifice. The punch orifice is through a first surface of the indicator base and is sized to receive a test punch and the dial indicator orifice is through a second surface of the indicator base. A dial indicator is attached to the indicator base and has a gauge and an indicator stem. A portion of the dial indicator extends through the dial indicator orifice and the indicator stem is at least partially located in the punch orifice.

In some embodiments of the present invention a punch deflection gauge has a die adaptor sized and shaped to be removably secured in a die socket. An indicator base is attached to the die adaptor and has a punch orifice and a dial indicator orifice. The punch orifice is through a first surface of the indicator base and is sized to receive a test punch, and the dial indicator orifice is through a second surface of the indicator base. An indicator shaft of a dial indicator having a gauge is housed in the dial indicator orifice of the indicator base and an indicator stem is housed in the indicator shaft of the dial indicator and is at least partially located in the punch orifice of the indicator base.

In some embodiments of the present invention a punch deflection gauge has a die adaptor sized and shaped to be removably secured in a die socket formed in a die table surface. The die adaptor has an indicator base attachment. An indicator base having a die adaptor attachment is removably coupled with the indicator base attachment. The indicator base rests on or proximal to the die table surface when the die adaptor is removably secured in the die socket and has a punch orifice and a dial indicator orifice. The punch orifice is through a first surface of the indicator base and is sized to receive a test punch, and the dial indicator orifice is through a second surface of the indicator base. An indicator shaft of a dial indicator having a gauge is housed in the dial indicator orifice of the indicator base and an indicator stem is housed in the indicator shaft of the dial indicator and is at least partially located in the punch orifice of the indicator base.

Some embodiments of the present invention provide a method of measuring punch deflection, where a die adaptor is secured in a die opening, a test punch is inserted in a punch guide corresponding to the die opening, a portion of the test punch is lowered into a punch orifice of an indicator base that is attached to the die adaptor, an indicator stem of a dial indicator attached to the indicator base is touched to the test punch, and the test punch is moved in a first and second direction, where the first and second directions are substantially opposite of one another.

Some embodiments of the present invention provide a method of measuring punch deflection in various sized die openings, where a preferred die adaptor is selected from a plurality of die adaptors that correspond to a plurality of different die openings, the preferred die adaptor is removably attached to an indicator base that has a punch orifice in a first surface and a dial indicator extending through an indicator orifice in a second surface, the test punch is inserted in a punch guide corresponding to the die opening, and a portion of the test punch is lowered into the punch orifice of the indicator base.

More information and a better understanding of the present invention can be achieved by reference to the following drawings and detailed description.

DETAILED DESCRIPTION

Figure 1:
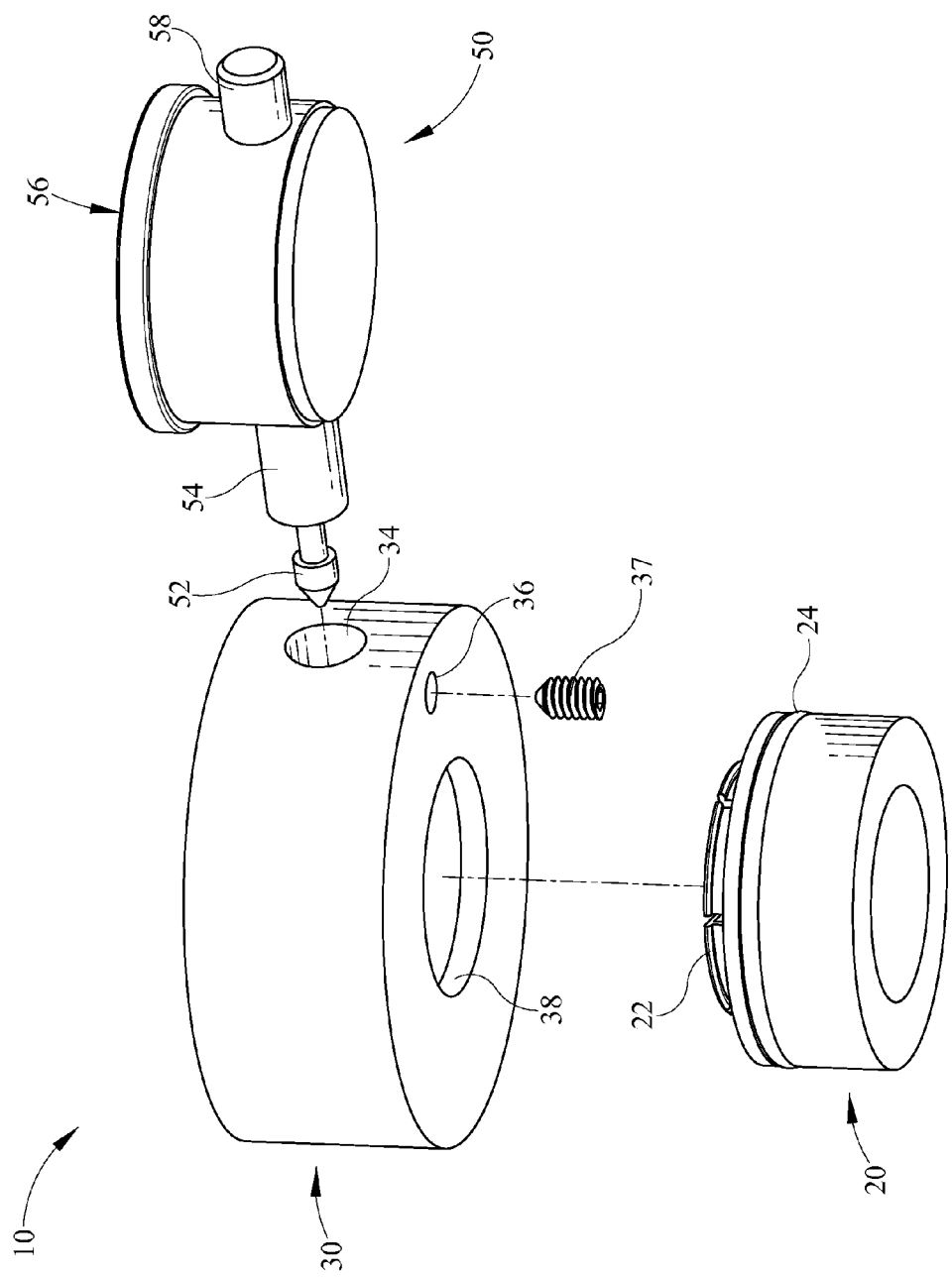
FIG. 1 is an exploded bottom perspective view of an embodiment of a punch deflection gauge.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalents thereof as well as additional items. Unless limited otherwise, the terms "connected," "coupled," "in communication with" and "mounted," and variations thereof are used broadly and encompass direct and indirect connections, couplings, and mountings. In addition, the terms "attached," "connected," and "coupled" and variations thereof are not restricted to physical or mechanical attachments, connections, or couplings. Furthermore, and as described in subsequent paragraphs, the specific mechanical configurations illustrated in the drawings are intended to exemplify embodiments of the invention and that other alternative mechanical configurations are possible.

Figure 2:
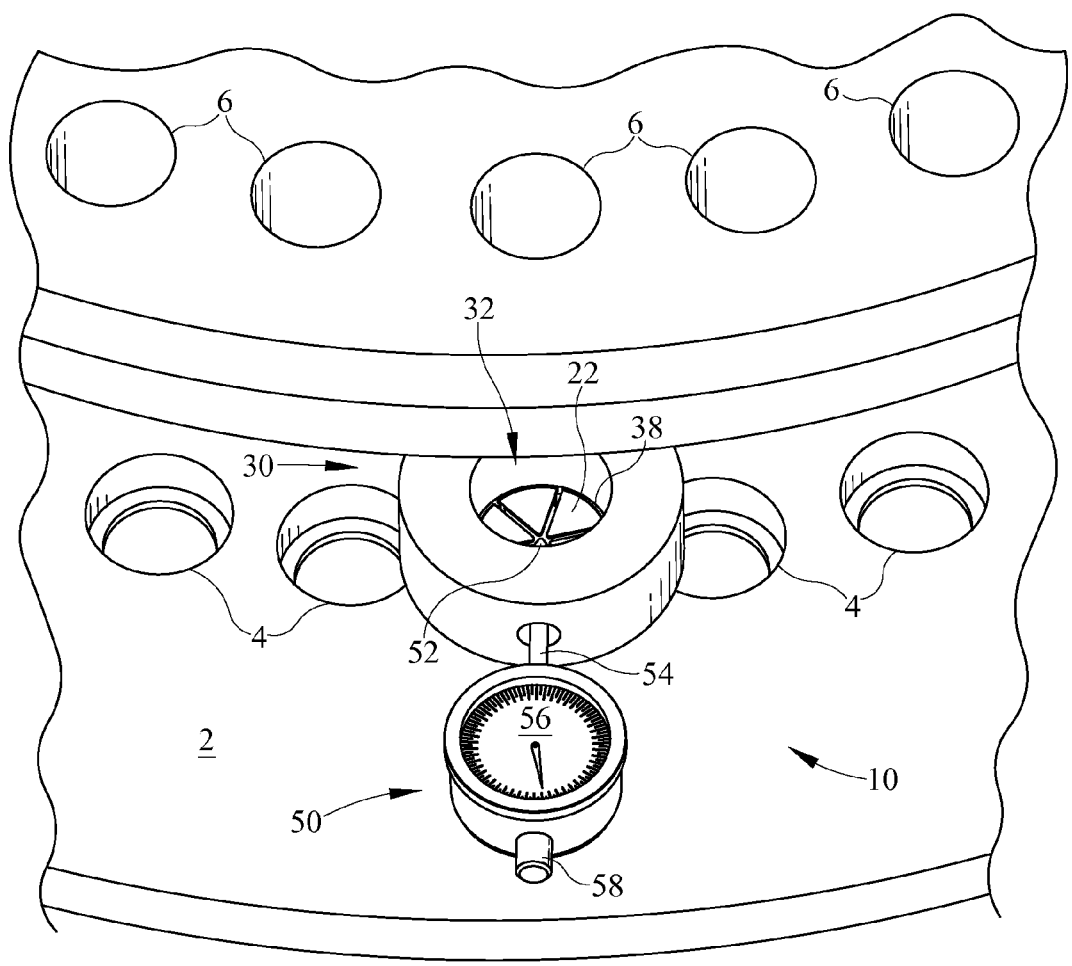
FIG. 2 is a top perspective view of the punch deflection gauge of FIG. 1 removably secured in a die opening of a die table surface of a turret.
Figure 3:
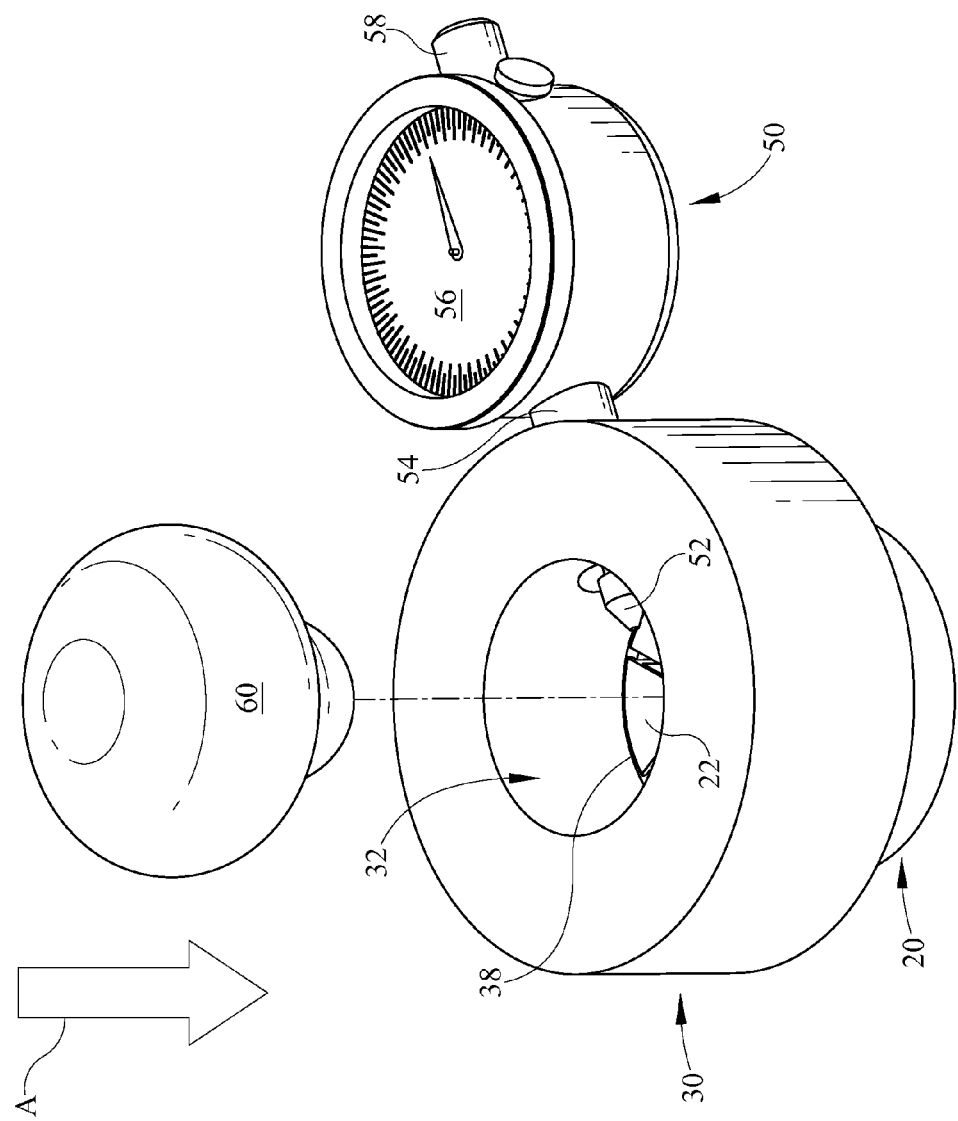
FIG. 3 is a top perspective view of the punch deflection gauge of FIG. 1 shown with a die adaptor removal tool.

Referring now in detail to the drawings, wherein like numerals indicate like elements throughout the several views, there are shown in FIGS. 1-5 various aspects of a punch deflection gauge. FIG. 1 shows an embodiment of punch deflection gauge 10 having a die adaptor 20, an indicator base 30 and a dial indicator 50. Die adaptor 20 is designed and sized to be removably secured in a die opening 4 of a die table surface 2, exemplary embodiments of which are shown in FIG. 2. An O-ring 24, shown in FIG. 5, may be provided around the periphery of die adaptor 20 in some embodiments to provide greater tension and minimize movement when die adaptor 20 is received in die opening 4. An indicator base attachment 22 is provided for removably securing die adaptor 20 to indicator base 30 via mating with die adaptor attachment 38 of indicator base 30. Die adaptor 20 may be any of a multitude of variably sized and shaped die adaptors and still provided with indicator base attachment 22 designed to removably secure the die adaptor to the same indicator base 30 via mating with die adaptor attachment 38 of indicator base 30. This enables punch deflection gauge 10 to be adaptable to various sizes and shapes of die openings by simply providing multiple variable die adaptors 20 that are each attachable to the same indicator base 30. Of course, punch deflection gauge 10 may be provided with an integrally formed or permanently attached die adaptor 20 and indicator base 30, as well as integrally formed or permanently attached dial indicator 50.

Indicator base 30 has a punch orifice 32, best shown in FIG. 2, provided through an upper surface thereof, and which provides for receipt of a test punch 12. Indicator base 30 also has a dial indicator orifice 34, provided through a sidewall thereof that receives a portion of dial indicator 50 and a set screw orifice 36, provided through a bottom surface thereof and in communication with dial indicator orifice 34. Set screw orifice 36 threadedly receives an accompanying set screw 37 that can be appropriately tightened to engage the portion of dial indicator 50 received in dial indicator orifice 34 and resultantly maintain dial indicator 50 in position. In the embodiment of FIG. 1, dial indicator 50 is provided with an indicator shaft 54 that is received in dial indicator orifice 34 and engaged by set screw 37 to maintain dial indicator 50 in position. Indicator shaft 54 houses an indicator stem 52, at least a portion of which is located in punch orifice 32 when indicator shaft 54 is received and secured in dial indicator orifice 34. An indicator gauge 56 displays the amount of displacement of indicator stem 52 along its movement path and an indicator adjustment 58 allows for zeroing or other adjustment of indicator gauge 56. Dial indicator 50 and indicator gauge 56 may take on a number of embodiments and may be mechanical or digital and may provide measurements graduated at any number of increments. In some embodiments indicator gauge 56 is mechanical and graduated in 0.0005 inch increments. However, in some embodiments indicator gauge 56 may be graduated in larger or smaller increments and may have a digital display. Moreover, in some embodiments readings taken by dial indicator 50 may be communicated to an indicator gauge 56 that is remote from the measurement site, such as, but not limited to, a remote digital display or computer. Dial indicator 50 may be secured to indicator base 30 in a number of manners or integrally formed with indicator base 30, so long as punch orifice 32 is accessible to indicator stem 52. For example, in some embodiments indicator base 30 may be provided without set screw 37 or set screw orifice 36 and dial indicator is appropriately positioned and secured through engagement of a threaded protrusion surrounding dial indicator orifice 34 and a matching nut formed around dial indicator shaft 54. In other embodiments separate securing apertures are provided in indicator base 30 that correspond with securing appendages that extend from indicator gauge 56 or indicator shaft 54.

In the embodiment of FIG. 1, indicator base attachment 22 is of the male variety and consists of a plurality of tabs having upper outward facing protrusions, with the tabs being mateable with die adaptor attachment 38, which in this embodiment is of the female variety. Once mated, the plurality of tabs engage an annular portion of die adaptor attachment 38 and the upper outward facing protrusions of the tabs prevent removal of the die adaptor attachment without excessive force or the use of a removal tool 60, shown in FIG. 3. Removal tool 60 can be inserted in punch orifice 32, in the general direction indicated by arrow A, and pressed against the tabs of indicator base attachment 22 to sufficiently disengage the tabs from the annular portion of die adaptor attachment 38 to allow for removal of die adaptor 20. In this embodiment, the upward facing portions of the tabs of indicator base attachment 22 form the base of punch orifice 32 when die adaptor 20 and indicator base 30 are mated.

Figure 4:
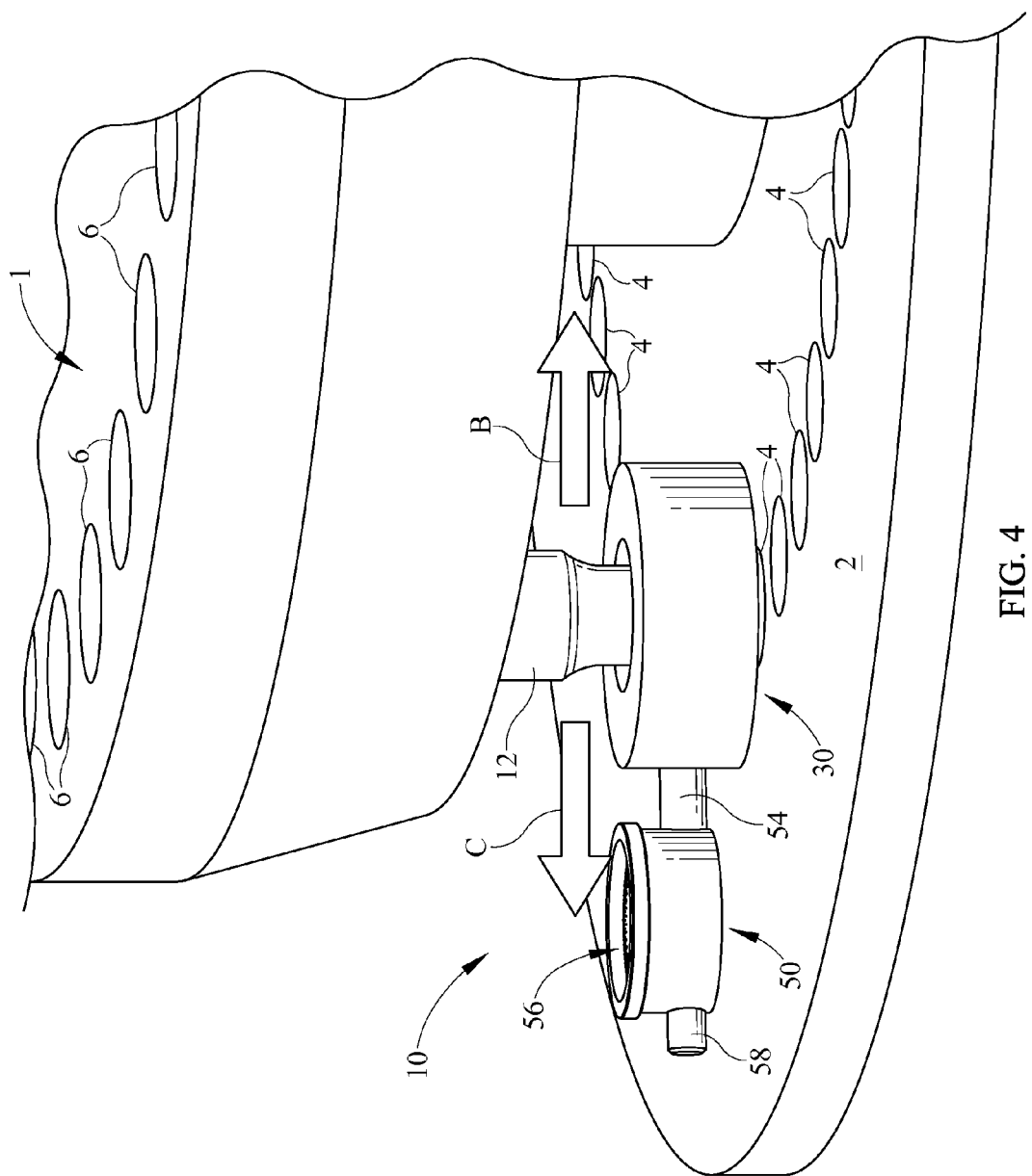
FIG. 4 is a top perspective view of the punch deflection gauge of FIG. 1 removably secured in a die opening of a die table surface of a turret and shown with a test punch inserted through an upper punch guide and into a punch orifice of an indicator base.

With reference to FIG. 4, in use, punch deflection gauge 10 is assembled with an appropriately sized die adaptor 20. Once assembled, die adaptor 20 is securely received in one die opening 4 formed in die table surface 2 of a turret 1 such that the bottom surface of indicator base 30 is proximal to or in contact with die table surface 2 and substantially parallel to die table surface 2. Punch deflection gauge 10 is preferably first rotated such that indicator stem 52 is pointing toward the center of turret 1, as shown in FIG. 4. An appropriately sized test punch 12 is then inserted in an upper punch guide 6 of turret 1 that corresponds with die opening 4 in which punch deflection gauge 10 is received. Test punch 12 is then lowered into punch orifice 32 with care being taken to not allow test punch 12 to drop onto indicator stem 52, moving indicator stem 52 toward the periphery of punch orifice 32 if necessary. Once test punch 12 is fully received in punch orifice 32, indicator stem 52 is adjusted or released such that its tip rests against test punch 12. The portion of test punch 12 proximal to punch orifice 32 is then forced toward the center of turret 1, along the same travel path of indicator stem 52, and generally along the path indicated by arrow B, until it stops. While holding test punch 12 at this position, indicator adjustment 58 is preferably adjusted so that "0" is displayed on indicator gauge 56. Test punch 12 is then forced in the opposite direction, along the same travel path of indicator stem 52, and generally along the path indicated by arrow C, until movement stops. The amount of displacement of indicator stem 52 as caused by the movement of test punch 12 is displayed on indicator gauge 56 and may be recorded by the user. Preferably, measurements are performed more than once to ensure readings remain constant. Punch deflection gauge 10 is then preferably rotated about die opening 4 and additional measurements taken by again forcing test punch 12 along the same travel path of indicator stem 52 until it stops, adjusting indicator adjustment 58, and moving test punch 12 in the opposite direction. Rotating punch deflection gauge 10 about die opening 4 and taking measurements at a plurality of angles enables a user to find the maximum deflection of test punch 12 in upper punch guide 6. If the maximum deflection is greater than desired, corrective action can be taken.

Figure 5:
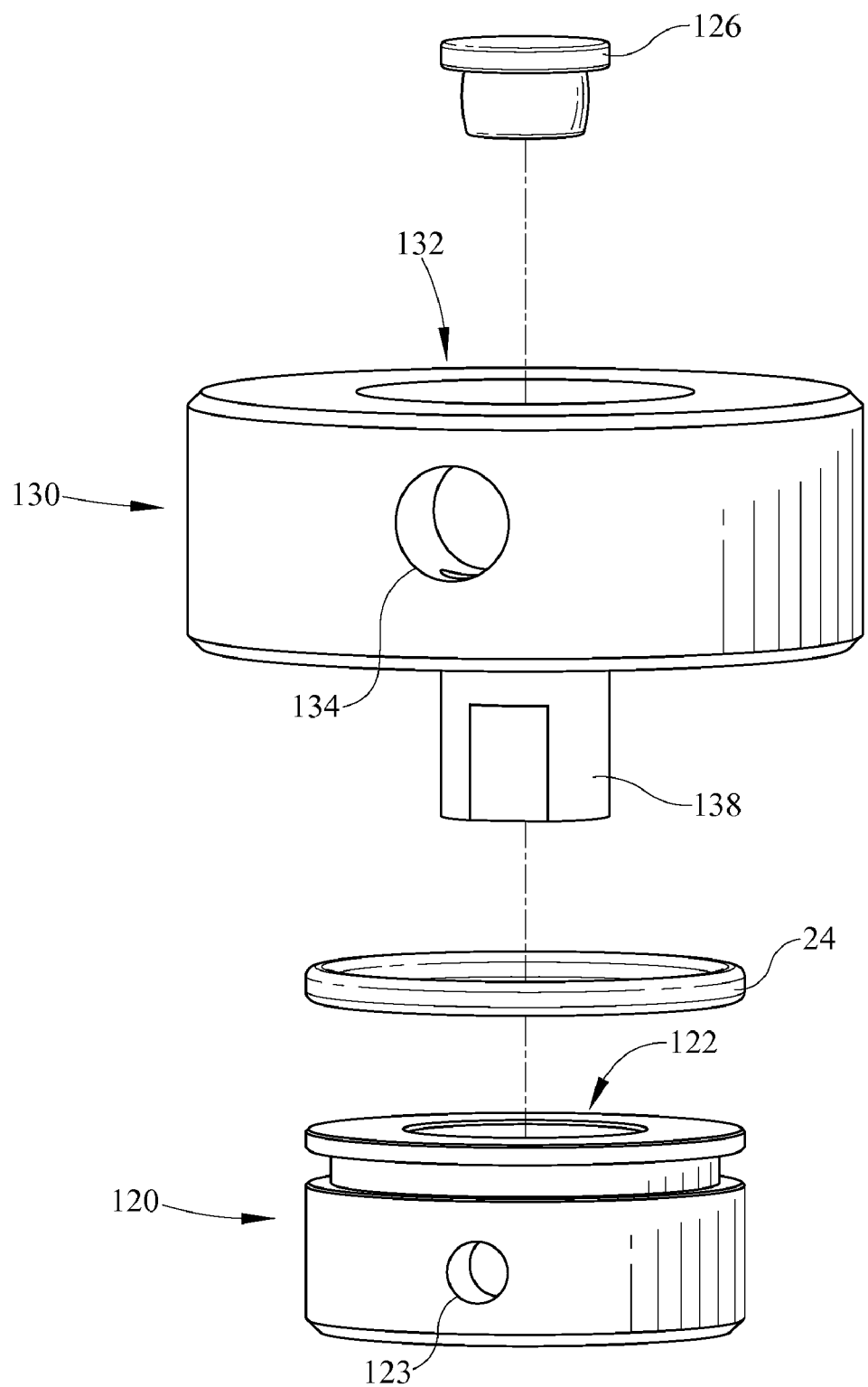
FIG. 5 is an exploded perspective view of a second embodiment of a die adaptor and an indicator base.

FIG. 5 shows another embodiment of a die adaptor 120 and an indicator base 130. Die adaptor 120 is designed and sized to be removably secured in a die opening 4 and has O-ring 24 around the periphery to provide increased friction with die opening 4. An indicator base attachment 122 is provided for removably securing die adaptor 120 to indicator base 130 via mating with die adaptor attachment 138 of indicator base 130.

In the embodiment of FIG. 5, indicator base attachment 122 is of the female variety and consists of an orifice that receives die adaptor attachment 138, which in this embodiment is of the male variety and has a tab. Once inserted, the tab of die adaptor attachment 138 engages a portion of indicator base attachment 122, preventing removal of the die adaptor attachment without inserting a tool through tab removal orifice 123 and sufficiently depressing the tab of die adaptor attachment 138. In this embodiment, indicator base 130 is provided with punch orifice 132 that receives a test punch 12 and dial indicator orifice 134 that receives and secures a portion of dial indicator 50. A plastic plug 126 is insertable into an orifice in the base of punch orifice 132 and it, along with other portions of indicator base 130, form the base of punch orifice 132. In other embodiments, indicator base 130 and die adaptor 120 may be provided as an integral unit.

The foregoing description of structures and methods has been presented for purposes of illustration. It is not intended to be exhaustive or to limit the invention to the precise steps and/or forms disclosed, and obviously many modifications and variations are possible in light of the above teaching. It is understood that while certain forms of an apparatus and method for measuring punch deflection have been illustrated and described, it is not limited thereto except insofar as such limitations are included in the following claims and allowable functional equivalents thereof

I claim:

1. A punch deflection gauge, comprising:
a die adaptor sized and shaped to be removably secured in a die socket;
an indicator base attached to said die adaptor, said indicator base having a punch orifice and a dial indicator orifice, said punch orifice being through a first surface of said indicator base and sized to receive a test punch, and said dial indicator orifice being through a second surface of said indicator base;
a dial indicator attached to said indicator base and having a gauge and an indicator stem, wherein a portion of said dial indicator extends through said dial indicator orifice, and said indicator stem is at least partially located in said punch orifice.

2. The punch deflection gauge of claim 1 wherein said dial indicator is permanently attached to said indicator base.

3. The punch deflection gauge of claim 1 wherein said die adaptor further comprises a female indicator base attachment that is mateable with a male die adaptor attachment of said indicator base.

4. The punch deflection gauge of claim 1 wherein said die adaptor further comprises a male indicator base attachment that is mateable with a female die adaptor attachment of said indicator base.

5. The punch deflection gauge of claim 4 wherein said male indicator base attachment consists of a plurality of tabs having upper outward facing protrusions, and said female die adaptor attachment consists of an orifice having an annular portion.

6. The punch deflection gauge of claim 1 wherein said gauge of said dial indicator is a digital display remotely located from said indicator shaft.

7. The punch deflection gauge of claim 1 wherein said gauge of said dial indicator is a display attached to said indicator shaft.

8. A punch deflection gauge, comprising:
a die adaptor sized and shaped to be removably secured in a die socket;
an indicator base attached to said die adaptor, said indicator base having a punch orifice and a dial indicator orifice, said punch orifice being through a first surface of said indicator base and sized to receive a test punch, and said dial indicator orifice being through a second surface of said indicator base;
a dial indicator having a gauge, an indicator shaft housed in said dial indicator orifice, and an indicator stem housed by said indicator shaft and at least partially located in said punch orifice.

9. The punch deflection gauge of claim 8 wherein said indicator base is permanently attached to said die adaptor.

10. The punch deflection gauge of claim 8 wherein said die adaptor further comprises a male indicator base attachment that is mateable with a female die adaptor attachment of said indicator base.

11. The punch deflection gauge of claim 10 wherein said male indicator base attachment consists of a plurality of tabs having upper outward facing protrusions, and said female die adaptor attachment consists of an orifice having an annular portion.

12. The punch deflection gauge of claim 8 wherein a set screw orifice is provided through a bottom surface of said indicator base.

13. The punch deflection gauge of claim 12 wherein said set screw orifice is in communication with said dial indicator orifice and receives a set screw to engage said indicator shaft.

14. The punch deflection gauge of claim 8 wherein a threaded protrusion surrounds said dial indicator orifice and mates with a corresponding nut around said indicator shaft.

15. The punch deflection gauge of claim 8 wherein said gauge of said dial indicator is a digital display remotely located from said indicator shaft.

16. The punch deflection gauge of claim 8 wherein said gauge of said dial indicator is a display attached to said indicator shaft.

17. A punch deflection gauge, comprising:
a die adaptor sized and shaped to be removably secured in a die socket formed in a die table surface, said die adaptor having an indicator base attachment;
an indicator base having a die adaptor attachment removably coupled with said indicator base attachment, said indicator base resting on or proximal to said die table surface when said die adaptor is removably secured in said die socket, said indicator base having a punch orifice and a dial indicator orifice, said punch orifice being through a first surface of said indicator base and sized to receive a test punch, and said dial indicator orifice being through a second surface of said indicator base;
a dial indicator having a gauge, an indicator shaft housed in said dial indicator orifice, and an indicator stem housed by said indicator shaft and at least partially located in said punch orifice.

18. The punch deflection gauge of claim 17 wherein said indicator base attachment consists of a plurality of tabs having upper outward facing protrusions, and said die adaptor attachment consists of an orifice having an annular portion and wherein said upper outward facing protrusions of said tabs engage said annular portion of said die adaptor attachment.

19. The punch deflection gauge of claim 18 wherein a removal tool is provided to be received in said punch orifice of said indicator base to engage said tab and disengage said die adaptor from said indicator base.

20. The punch deflection gauge of claim 17 wherein said indicator base attachment consists of an orifice and said die adaptor attachment consists of a member receivable in said orifice and having a tab, said tab being removably engageable with a portion of said orifice of said base attachment.

21. The punch deflection gauge of claim 17 wherein said dial indicator orifice extends in a direction substantially perpendicular to said punch orifice.

22. The punch deflection gauge of claim 17 wherein a set screw orifice is provided through a bottom surface of said indicator base, said set screw orifice being in communication with said dial indicator orifice and receiving a set screw to engage said indicator shaft.

23. The punch deflection gauge of claim 17 wherein said dial indicator is permanently attached to said indicator base.

24. The punch deflection gauge of claim 17 wherein said gauge of said dial indicator is a display remotely located from said indicator shaft.

25. The punch deflection gauge of claim 17 wherein said gauge of said dial indicator is a display attached to said indicator shaft.

26. A method of measuring punch deflection, comprising:
    securing a die adaptor in a die opening,
    inserting a test punch in a punch guide corresponding to said die opening,
    lowering a portion of said test punch into a punch orifice of an indicator base attached to said die adaptor,
    touching an indicator stem of a dial indicator attached to said indicator base to said test punch,
    moving said test punch in a first and a second direction, said first and second directions being substantially opposite of one another.

27. The method of measuring punch deflection of claim 26, further comprising rotating at least said indicator base and causing said indicator stem to face in a different direction, then touching said indicator stem to said test punch and moving said test punch in a third and a fourth direction, said third and fourth direction being substantially opposite of one another and different from said first and second directions.

28. The method of measuring punch deflection of claim 26 wherein said dial indicator is zeroed after said test punch is moved in said first direction, but before said test punch is moved in said second direction.

29. The method of measuring punch deflection of claim 26 wherein said indicator base is removably attached to said die adaptor.

30. A method of measuring punch deflection in various sized die openings, comprising:
    selecting a preferred die adaptor from a plurality of die adaptors that correspond to a plurality of different die openings,
    removably attaching said preferred die adaptor to an indicator base having a punch orifice in a first surface thereof and a portion of a dial indicator extending through an indicator orifice in a second surface thereof,
    inserting a test punch in a punch guide corresponding to said die opening,
    lowering a portion of said test punch into said punch orifice of said indicator base.

31. The method of measuring punch deflection in various size die openings of claim 30, further comprising touching an indicator stem of said dial indicator to said test punch and moving said test punch in a first and a second direction, said first and second directions being substantially opposite of one another.

32. The method of measuring punch deflection in various size die openings of claim 30, further comprising rotating at least said indicator base and causing said indicator stem to face in a different direction, then touching said indicator stem to said test punch and moving said test punch in a third and a fourth direction, said third and fourth direction being substantially opposite of one another and different from said first and second directions.

* * * * *